United States Patent
Zou

(10) Patent No.: US 10,040,634 B2
(45) Date of Patent: Aug. 7, 2018

(54) RUBBER COMPOSITION FOR HEAT-RESISTANT CONVEYOR BELTS AND HEAT-RESISTANT CONVEYOR BELT

(71) Applicant: The Yokohama Rubber Co., LTD., Minato-ku, Tokyo (JP)

(72) Inventor: Deqing Zou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/329,242

(22) PCT Filed: Jul. 16, 2015

(86) PCT No.: PCT/JP2015/070411
§ 371 (c)(1),
(2) Date: Jan. 25, 2017

(87) PCT Pub. No.: WO2016/013486
PCT Pub. Date: Jan. 28, 2016

(65) Prior Publication Data
US 2017/0203923 A1    Jul. 20, 2017

(30) Foreign Application Priority Data
Jul. 25, 2014 (JP) .................................. 2014-152133

(51) Int. Cl.
*C08L 23/16* (2006.01)
*B65G 15/34* (2006.01)
*B65G 15/36* (2006.01)
*C08K 5/14* (2006.01)

(52) U.S. Cl.
CPC ............. *B65G 15/34* (2013.01); *B65G 15/36* (2013.01); *C08K 5/14* (2013.01); *C08L 23/16* (2013.01); *C08L 2205/02* (2013.01)

(58) Field of Classification Search
CPC ............................ C08L 2205/02; C08L 23/16
See application file for complete search history.

(56) References Cited

U.S. PATENT DOCUMENTS

2004/0267570 A1* 12/2004 Becker .................... A61B 5/00
705/2
2007/0203295 A1*  8/2007 Ono ........................ C08L 61/06
525/132

FOREIGN PATENT DOCUMENTS

| JP | H03-035041  | 2/1991  |
| JP | H08-059924  | 3/1996  |
| JP | H10-168257  | 6/1998  |
| JP | 2000-169824 | 6/2000  |
| JP | 2011-178917 | * 9/2011 |

OTHER PUBLICATIONS

International Search Report for International Application No. PCT/JP2015/070411 dated Aug. 25, 2015, 4 pages, Japan.

* cited by examiner

*Primary Examiner* — Mark S Kaucher
(74) *Attorney, Agent, or Firm* — Thorpe North & Western

(57) ABSTRACT

A rubber composition for heat-resistant conveyor belts contains an ethylene-1-butene copolymer having a Mooney viscosity at 125° C. of 20 or greater, and an ethylene-propylene copolymer having a Mooney viscosity at 125° C. of 20 or greater and an ethylene content of 40 to 60 mass %, and the mass ratio of the ethylene-1-butene copolymer to the ethylene-propylene copolymer is 10/90 to 90/10.

9 Claims, 1 Drawing Sheet

US 10,040,634 B2

RUBBER COMPOSITION FOR HEAT-RESISTANT CONVEYOR BELTS AND HEAT-RESISTANT CONVEYOR BELT

TECHNICAL FIELD

The present technology relates to a rubber composition for heat-resistant conveyor belts and a heat-resistant conveyor belt.

BACKGROUND ART

In Japanese Unexamined Patent Application Publication No. 2011-178917A, claim 1 describes "a rubber composition for heat-resistant conveyor belts comprising an ethylene-α-olefin copolymer having a melting point of 40° C. or lower," claim 2 describes "further comprising an ethylene-propylene copolymer having an ethylene content of 60 to 80 mass %," and claim 3 describes "the ethylene-α-olefin copolymer is an ethylene-1-butene copolymer having a melting point of 40° C. or lower."

The present inventor has investigated the rubber composition for heat-resistant conveyor belts described in Japanese Unexamined Patent Application Publication No. 2011-178917A, and discovered that heat resistance is insufficient. Specifically, the tensile strength ($T_B$) at 150° C. is small, and the rate of change ($\Delta T_B$) between the tensile strength at room temperature and the tensile strength at 150° C. is large.

SUMMARY

The present technology provides a rubber composition for heat-resistant conveyor belts having excellent heat resistance.

The present inventor has intensively studied, and as a result, found that when the Mooney viscosity of an ethylene-1-butene copolymer is increased and the ethylene content of an ethylene-propylene copolymer is decreased, heat resistance is improved.

Specifically, the present technology provides the following (1) to (5).

(1) A rubber composition for heat-resistant conveyor belts containing:

an ethylene-1-butene copolymer having a Mooney viscosity at 125° C. of 20 or greater; and an ethylene-propylene copolymer having a Mooney viscosity at 125° C. of 20 or greater and an ethylene content of 40 to 60 mass %, wherein a mass ratio of the ethylene-1-butene copolymer to the ethylene-propylene copolymer is 10/90 to 90/10.

(2) The rubber composition for heat-resistant conveyor belts according to (1) above, wherein a Mooney viscosity at 125° C. of the ethylene-1-butene copolymer is 30 or greater.

(3) The rubber composition for heat-resistant conveyor belts according to (1) or (2) above, wherein an ethylene content of the ethylene-propylene copolymer is 40 mass % or greater and less than 60 mass %.

(4) The rubber composition for heat-resistant conveyor belts according to any one of (1) to (3) above, further containing an organic peroxide, wherein a content of the organic peroxide is from 0.011 to 0.020 molar equivalents relative to 100 parts by mass of the total of the ethylene-1-butene copolymer and the ethylene-propylene copolymer.

(5) A heat-resistant conveyor belt including the rubber composition for heat-resistant conveyor belts described in any one of claims 1 to 4.

The present technology can provide a rubber composition for heat-resistant conveyor belts having excellent heat resistance.

DETAILED DESCRIPTION

Figure 1:
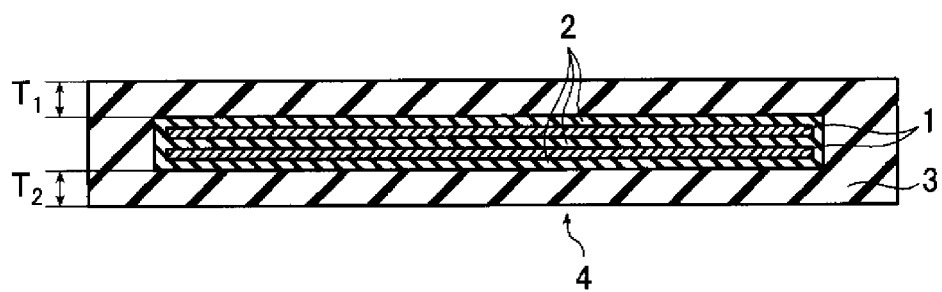
FIG. 1 is a cross-sectional view of an embodiment of a heat-resistant conveyor belt of the present technology.

Hereinafter, a rubber composition for heat-resistant conveyor belts of the present technology and a heat-resistant conveyor belt of the present technology will be described.

In this specification, a numerical range represented using "(from) . . . to . . . " refers to a range including a numerical values preceding "to" as a lower limit value and a numerical value following "to" as an upper limit value, respectively.

Rubber Composition for Heat-Resistant Conveyor Belts

The rubber composition for heat-resistant conveyor belts of the present technology (hereinafter, also simply referred to as "rubber composition of the present technology") is a rubber composition for heat-resistant conveyor belts containing an ethylene-1-butene copolymer having a Mooney viscosity at 125° C. of 20 or greater, and an ethylene-propylene copolymer having a Mooney viscosity at 125° C. of 20 or greater and an ethylene content of 40 to 60 mass %, wherein the mass ratio of the ethylene-1-butene copolymer to the ethylene-propylene copolymer is 10/90 to 90/10.

The rubber composition of the present technology has excellent heat resistance due to having the above-described configuration.

A reason for this is not clear, but this is considered because use of the ethylene-1-butene copolymer having a high Mooney viscosity and the ethylene-propylene copolymer having a low ethylene content in combination makes physical properties at high temperature after vulcanization (crosslinking) optimal. This mechanism is an estimation, and a mechanism other than this is also included in the scope of the present technology.

Each of the components contained in the rubber composition of the present technology is described hereinafter.

Ethylene-1-Butene Copolymer

The rubber composition of the present technology contains an ethylene-1-butene copolymer (EBM) having a Mooney viscosity at 125° C. of 20 or greater.

The Mooney viscosity at 125° C. of the ethylene-1-butene copolymer (EBM) is preferably 30 or greater, and more preferably 40 or greater since the heat resistance is more excellent. The upper limit value is not particularly limited, but it is preferably 70 or less, and more preferably 55 or less.

The Mooney viscosity at 125° C. is a viscosity (ML1+4, 125° C.) measured using a L-type rotor at a test temperature of 125° C. for a preheating time of 1 minute and a rotor-rotation time of 4 minutes in accordance with JIS (Japanese Industrial Standard) K6300-1-2001 (same hereinafter).

The ethylene content of the ethylene-1-butene copolymer (EBM) is not particularly limited, but it is preferably from 60 to 90 mass %, and more preferably from 65 to 85 mass %.

As the ethylene-1-butene copolymer (EBM), a commercially available product can be used. Specific examples thereof may include an ethylene-1-butene copolymer having a Mooney viscosity at 125° C. of 47 (trade name "Engage 7487").

The Mooney viscosity at 125° C. of an ethylene-1-butene copolymer (trade name "Engage 7467") described in paragraph [0038] of Patent Document 1 is 19.

Ethylene-Propylene Copolymer

In addition to the ethylene-1-butene copolymer (EBM), the rubber composition of the present technology contains the ethylene-propylene copolymer (EPM) having a Mooney viscosity at 125° C. of 20 or greater and an ethylene content of 40 to 60 mass %.

The Mooney viscosity at 125° C. of the ethylene-propylene copolymer (EPM) is not particularly limited as long as it is 20 or greater, and it is preferably 25 or greater. The upper limit value is not particularly limited, but it is preferably 50 or less, and more preferably 40 or less.

The ethylene content of the ethylene-propylene copolymer (EPM) is preferably 40 mass % or greater and less than 60 mass %, and more preferably 45 to 55 mass % since the heat resistance is more excellent.

As the ethylene-propylene copolymer (EPM), a commercially available product can be used. Specific examples thereof may include an ethylene-propylene copolymer having a Mooney viscosity at 125° C. of 26 and an ethylene content of 52 mass % (trade name "KEP-110").

The Mooney viscosity at 125° C. of an ethylene-propylene copolymer (trade name "VISTALON 706") described in paragraph [0038] of Patent Document 1 is 42, and the ethylene content thereof is 65 mass %.

Mass Ratio

The mass ratio (EBM/EPM) of the ethylene-1-butene copolymer (EBM) to the ethylene-propylene copolymer (EPM) is 10/90 to 90/10, preferably 15/85 to 70/30, and more preferably 20/80 to 50/50.

Organic Peroxide

The rubber composition of the present technology may further contain an organic peroxide as a cross-linking agent.

The organic peroxide is not particularly limited, and a conventionally known organic peroxide can be used. Specific examples thereof may include dicumylperoxide, di-t-butylperoxide, 1,3-bis(t-butylperoxyisopropyl)benzene, n-butyl 4,4'-di(t-butylperoxy)valerate, and 2,5-dimethyl-2,5-bis(t-butylperoxy)hexane. One type of the organic peroxide may be used alone, or two or more types thereof may be used in combination.

The content of the organic peroxide is not particularly limited, but it is preferably from 0.007 to 0.024 molar equivalents, and more preferably from 0.011 to 0.020 molar equivalents relative to 100 parts by mass of the sum of the ethylene-1-butene copolymer (EBM) and the ethylene-propylene copolymer (EPM).

As the organic peroxide, a commercially available product can be used. Specific examples thereof may include 1,3-bis(t-butylperoxyisopropyl)benzene (trade name "Perkadox 14-40," manufactured by Kayaku Akzo Corporation).

Optional Components

In addition to the components described above, the rubber composition of the present technology may contain additives that are typically used, such as carbon black, zinc oxide, stearic acid, an anti-aging agent, oil, a plasticizer, and a cross-linking agent other than the organic peroxides described above, in the range that does not impair the object of the present technology. The contents of the additives may be appropriately determined in the range that does not impair the object of the present technology.

The rubber composition of the present technology can be produced, for example, under publicly known conditions by publicly known methods. For example, the rubber composition of the present technology can be produced by mixing the above-described components using a Banbury mixer, a kneader, a roll, or the like.

Heat-Resistant Conveyor Belt

Next, the heat-resistant conveyor belt of the present technology will be described.

The heat-resistant conveyor belt of the present technology is a heat-resistant conveyor belt using the rubber composition of the present technology. The shape, production method, and the like thereof can be the same as those of publicly known heat-resistant conveyor belt.

A specific configuration of the heat-resistant conveyor belt of the present technology includes, for example, the following.

A first embodiment of the heat-resistant conveyor belt of the present technology is described using FIG. 1.

FIG. 1 is a cross-sectional view of an embodiment of the heat-resistant conveyor belt of the present technology. As illustrated in FIG. 1, the first embodiment of the heat-resistant conveyor belt of the present technology is a heat-resistant conveyor belt 4 that is formed by covering canvas 1 with a coating rubber (adhesive rubber) 2 to form a core material layer and covering the periphery of the core material layer with a cover rubber 3 that is the rubber composition of the present technology.

The heat-resistant conveyor belt 4 of FIG. 1 has the canvas 1 that is formed from a woven fabric of synthetic fibers such as nylon, vinylon, and polyester, as a core material. The number of laminated layers of the canvas 1, the thickness and the belt width of the cover rubber 3, and the like are appropriately selected depending on the intended use; however, the thicknesses $T_1$ and $T_2$ of the cover rubber 3 are typically approximately from 1.5 to 20 mm.

As the coating rubber 2, a coating rubber used in the publicly known heat-resistant conveyor belt can be used. For example, a rubber composition containing, as the rubber component, natural rubber (NR), acrylonitrile-butadiene rubber (NBR), styrene-butadiene copolymer rubber (SBR), butadiene rubber (BR), or the like can be used.

Next, a second embodiment of the heat-resistant conveyor belt of the present technology will be described using FIG. 2.

Figure 2:
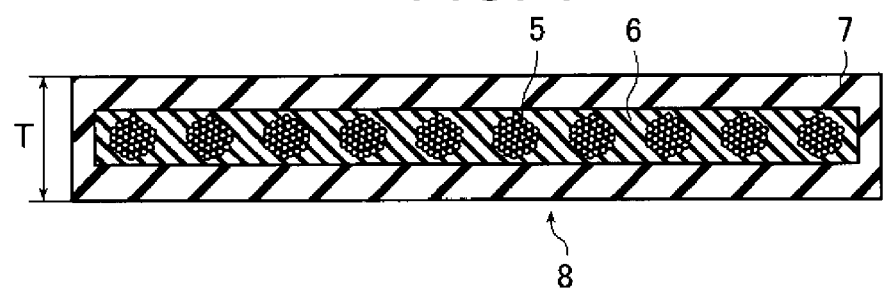
FIG. 2 is a cross-sectional view of another embodiment of the heat-resistant conveyor belt of the present technology.

FIG. 2 is a cross-sectional view of another embodiment of the heat-resistant conveyor belt of the present technology.

As illustrated in FIG. 2, the second embodiment of the heat-resistant conveyor belt of the present technology is a heat-resistant conveyor belt 8 that is formed by covering steel cords 5 with a cushioning rubber (adhesive rubber) 6 to form a core material layer and covering the periphery of the core material layer with a cover rubber 7 that is the rubber composition of the present technology.

The heat-resistant conveyor belt 8 of FIG. 2 has core materials that are formed by arranging approximately 50 to 230 steel cords 5 having a diameter of approximately 2.0 to 9.5 mm in parallel. The steel cords 5 are each formed by twisting a plurality of wire strands having diameters of approximately 0.2 to 0.4 mm. Typically, the total thickness T of the heat-resistant conveyor belt 8 is approximately from 10 to 50 mm.

As the cushion rubber 6, for example, an adhesive rubber that can be bonded to a zinc-galvanized steel cord used in a publicly known steel conveyor belt can be used. Specifically, a rubber composition containing, as the rubber component, natural rubber (NR), acrylonitrile-butadiene rubber (NBR), styrene-butadiene copolymer rubber (SBR), butadiene rubber (BR), or the like can be used.

The heat-resistant conveyor belt described above can be easily produced by arranging canvas or steel cords that becomes a core material between unvulcanized rubber sheets that are formed using the rubber composition of the present technology, and then vulcanizing by press-heating in accordance with a conventional method.

The vulcanization condition is typically at approximately 120 to 180° C. under approximately 0.1 to 4.9 MPa for approximately 10 to 90 minutes.

The heat-resistant conveyor belt of the present technology has excellent heat resistance due to use of the above-described rubber composition of the present technology.

EXAMPLES

The rubber composition of the present technology will be further described below with reference to examples. However, the present technology is not limited to these examples.

Preparation of Rubber Composition

Components shown in the Table 1 below were mixed at each composition shown in the Table 1 below (only crosslinking agent 1 is represented in molar equivalent, and other components are represented in part by mass), to prepare each rubber composition for heat-resistant conveyor belts (hereinafter simply referred to as "rubber composition").

Specifically, a master batch was obtained by first kneading the components shown in Table 1 below, except for crosslinking agents 1 and 2, for 5 minutes by a Banbury mixer (3.4 L), and then discharging the kneaded product when the temperature reached 160° C. A rubber composition was obtained by kneading the crosslinking agents 1 and 2 with the obtained master batch by an open roll.

$T_B$ (Ordinary State)

Each of the obtained rubber compositions was vulcanized for 45 minutes under a surface pressure of 3.0 MPa, using a press molding machine set to 150° C. to produce a vulcanized sheet having a thickness of 2 mm. JIS No. 3 dumbbell-shaped test pieces were cut out of these sheets and tensile tests were conducted in accordance with JIS K6251:2010 at a tensile test speed of 500 mm/minute. The tensile strength ($T_B$) [MPa] was measured at room temperature. The results are shown in Table 1 below.

$T_B$ (at High Temperature)

The tensile strength ($T_B$) [MPa] of the vulcanized sheet was measured in a constant temperature bath of 150° C. in the same manner as described above. The composition can be evaluated as having excellent heat resistance when the value of $T_B$ (at high temperature) is 4.8 or greater. The results are shown in Table 1 below.

$\Delta T_B$

A rate of change ($\Delta T_B$) [%] between the tensile strength ($T_B$ (ordinary state)) at room temperature and the tensile strength ($T_B$ (at high temperature)) at 150° C. was determined. The composition can be evaluated as having excellent heat resistance when the value of $\Delta T_B$ is −70 or greater. The results are shown in Table 1 below.

Rate of change $(\Delta T_B) = \{(T_B \text{ (at high temperature)} - T_B \text{ (ordinary state)}) / T_B \text{ (ordinary state)}\} \times 100$

TABLE 1-1

| | Comparative Examples | | | | | |
|---|---|---|---|---|---|---|
| | 1 | 2 | 3 | 4 | 5 | 6 |
| EBM 1 (Mooney viscosity at 125° C.: 19) | 80 | 50 | 20 | 10 | 30 | 70 |
| EBM 2 (Mooney viscosity at 125° C.: 47) | | | | | | |
| EPM 1 (ethylene content: 52 mass %) | | | | | 70 | 30 |
| EPM 2 (ethylene content: 65 mass %) | 20 | 50 | 80 | 90 | | |
| Carbon black | 50 | 50 | 50 | 50 | 50 | 50 |
| Zinc oxide | 5 | 5 | 5 | 5 | 5 | 5 |
| Stearic acid | 1 | 1 | 1 | 1 | 1 | 1 |
| Anti-aging agent 1 | 6 | 6 | 6 | 6 | 6 | 6 |
| Anti-aging agent 2 | 3 | 3 | 3 | 3 | 3 | 3 |
| Oil | 1.2 | 1.2 | 1.2 | 1.2 | 1.2 | 1.2 |
| Plasticizer | 15 | 15 | 15 | 15 | 15 | 15 |
| Crosslinking agent 1 (molar equivalent) | 0.013 | 0.013 | 0.013 | 0.013 | 0.013 | 0.013 |
| Crosslinking agent 2 | 3 | 3 | 3 | 3 | 3 | 3 |
| $T_B$ (ordinary state) [MPa] | 14.6 | 15.1 | 15.7 | 16.0 | 9.6 | 11.2 |
| $T_B$ (at high temperature) [MPa] | 3.1 | 3.7 | 4.4 | 4.6 | 3.5 | 3.6 |
| $\Delta T_B$ [%] | −79 | −75 | −72 | −71 | −64 | −68 |

| | Working Examples | | |
|---|---|---|---|
| | 1 | 2 | 3 |
| EBM 1 (Mooney viscosity at 125° C.: 19) | | | |
| EBM 2 (Mooney viscosity at 125° C.: 47) | 30 | 30 | 30 |
| EPM 1 (ethylene content: 52 mass %) | 70 | 70 | 70 |
| EPM 2 (ethylene content: 65 mass %) | | | |
| Carbon black | 50 | 50 | 50 |
| Zinc oxide | 5 | 5 | 5 |
| Stearic acid | 1 | 1 | 1 |
| Anti-aging agent 1 | 6 | 6 | 6 |
| Anti-aging agent 2 | 3 | 3 | 3 |
| Oil | 1.2 | 1.2 | 1.2 |
| Plasticizer | 15 | 15 | 15 |
| Crosslinking agent 1 (molar equivalent) | 0.013 | 0.018 | 0.020 |
| Crosslinking agent 2 | 3 | 3 | 3 |

TABLE 1-1-continued

| | | | |
|---|---|---|---|
| $T_B$ (ordinary state) [MPa] | 14.2 | 17.0 | 17.7 |
| $T_B$ (at high temperature) [MPa] | 4.9 | 5.3 | 6.0 |
| $\Delta T_B$ [%] | −65 | −69 | −66 |

As the components shown in Table 1, the following components were used.

EBM 1: ethylene-1-butene copolymer having a Mooney viscosity at 125° C. of 19 and an ethylene content of 74 mass %, trade name: Engage 7467 (manufactured by The Dow Chemical company)

EBM 2: ethylene-1-butene copolymer having a Mooney viscosity at 125° C. of 47 and an ethylene content of 74 mass %, trade name: Engage 7487 (manufactured by The Dow Chemical company)

EPM 1: ethylene-propylene copolymer having a Mooney viscosity at 125° C. of 26 and an ethylene content of 52 mass %, trade name: KEP-110 (manufactured by KUMHO POLYCHEM)

EPM 2: ethylene-propylene copolymer having a Mooney viscosity at 125° C. of 42 and an ethylene content of 65 mass %, trade name: VISTALON 706 (manufactured by Exxon Mobil Chemical)

Carbon black: trade name: Niteron #300 (manufactured by Nippon Steel Chemical Carbon Co. Ltd.)

Zinc oxide: trade name: Zinc Oxide III (manufactured by Seido Chemical Industry Co., Ltd.)

Stearic acid: trade name: stearic acid 505 (manufactured by Chiba Fatty Acid Co., Ltd.)

Anti-aging agent 1: trade name: NOCRAC MMB (manufactured by Ouchi Shinko Chemical Industrial Co., Ltd.)

Anti-aging agent 2: trade name: NONFLEX LAS-P (manufactured by Seiko Chemical Co., Ltd.)

Oil: trade name: SUNPAR 2280 (manufactured by Japan Sun Oil Company, Ltd.)

Plasticizer: trade name: Lucant HC-3000X (manufactured by Mitsui Chemicals, Inc.)

Crosslinking agent 1: trade name: Perkadox 14-40 (manufactured by Kayaku Akzo Corporation)

Crosslinking agent 2: trade name: Hi-Cross GT (manufactured by Seiko Chemical Co., Ltd.)

As clear from the results shown in Table 1 above, in Working Examples 1 to 3 in which EBM 2 having a Mooney viscosity at 125° C. of 47 and EPM 1 having an ethylene content of 52 mass % were used in combination, the value of $\Delta T_B$ was −70 or greater. This shows that the compositions had excellent heat resistance.

In contrast, in Comparative Examples 1 to 4 in which EBM 1 having a Mooney viscosity at 125° C. of 19 and EPM 2 having an ethylene content of 65 mass % were used in combination, the value of $\Delta T_B$ (at high temperature) was less than 4.8 and the value of $\Delta T_B$ was less than −70. This shows that the compositions had poor heat resistance. Comparative Examples 1 to 4 correspond to Working Examples 2 to 5 of Patent Document 1.

In Comparative Examples 5 and 6 in which EBM 1 and EPM 1 were used in combination, the value of $\Delta T_B$ was −70 or greater, but the value of $\Delta T_B$ (at high temperature) was less than 4.8. Therefore, the compositions had poor heat resistance.

The invention claimed is:

1. A rubber composition for heat-resistant conveyor belts comprising:
   an ethylene-1-butene copolymer having a Mooney viscosity at 125° C. of 20 or greater; and
   an ethylene-propylene copolymer having a Mooney viscosity at 125° C. of 20 or greater and an ethylene content of 40 to 55 mass %,
   wherein a mass ratio of the ethylene-1-butene copolymer to the ethylene-propylene copolymer is 10/90 to 90/10.

2. The rubber composition for heat-resistant conveyor belts according to claim 1, wherein a Mooney viscosity at 125° C. of the ethylene-1-butene copolymer is 30 or greater.

3. The rubber composition for heat-resistant conveyor belts according to claim 1, wherein an ethylene content of the ethylene-propylene copolymer is 40 mass % or greater and less than 60 mass %.

4. The rubber composition for heat-resistant conveyor belts according to claim 1, further comprising an organic peroxide, wherein a content of the organic peroxide is from 0.011 to 0.020 molar equivalents relative to 100 parts by mass of the total of the ethylene-1-butene copolymer and the ethylene-propylene copolymer.

5. A heat-resistant conveyor belt comprising the rubber composition for heat-resistant conveyor belts according to claim 1.

6. The rubber composition for heat-resistant conveyor belts according to claim 2, wherein an ethylene content of the ethylene-propylene copolymer is 40 mass % or greater and less than 60 mass %.

7. The rubber composition for heat-resistant conveyor belts according to claim 6, further comprising an organic peroxide, wherein a content of the organic peroxide is from 0.011 to 0.020 molar equivalents relative to 100 parts by mass of the total of the ethylene-1-butene copolymer and the ethylene-propylene copolymer.

8. The rubber composition for heat-resistant conveyor belts according to claim 2, further comprising an organic peroxide, wherein a content of the organic peroxide is from 0.011 to 0.020 molar equivalents relative to 100 parts by mass of the total of the ethylene-1-butene copolymer and the ethylene-propylene copolymer.

9. The rubber composition for heat-resistant conveyor belts according to claim 3, further comprising an organic peroxide, wherein a content of the organic peroxide is from 0.011 to 0.020 molar equivalents relative to 100 parts by mass of the total of the ethylene-1-butene copolymer and the ethylene-propylene copolymer.

* * * * *